United States Patent
Page et al.

[11] Patent Number: 6,167,069
[45] Date of Patent: Dec. 26, 2000

[54] THERMAL LENS ELIMINATION BY GRADIENT-REDUCED ZONE COUPLING OF OPTICAL BEAMS

[75] Inventors: Ralph H. Page, San Ramon; Raymond J. Beach, Livermore, both of Calif.

[73] Assignee: The Regents of the University of California, Oakland, Calif.

[21] Appl. No.: 09/071,248

[22] Filed: May 1, 1998

[51] Int. Cl.[7] .................................................. H01S 3/04
[52] U.S. Cl. ............................................. 372/34; 372/36
[58] Field of Search .................................. 372/34, 36

[56] References Cited

U.S. PATENT DOCUMENTS

| | | | |
|---|---|---|---|
| Re. 33,722 | 10/1991 | Scrifes et al. | 385/33 |
| 5,386,427 | 1/1995 | Zayhowski | 372/34 |
| 5,541,948 | 7/1996 | Krupke et al. | 372/41 |
| 5,974,061 | 10/1999 | Byren et al. | 372/34 |
| 6,028,873 | 2/2000 | Yamamoto et al. | 372/39 |

*Primary Examiner*—Frank G. Font
*Assistant Examiner*—Armando Rodriguez
*Attorney, Agent, or Firm*—John P. Wooldridge; Alan H. Thompson

[57] ABSTRACT

A thermal gradient-reduced-zone laser includes a laser medium and an optically transparent plate with an index of refraction that is less than the index of refraction of the laser medium. The pump face of the laser medium is bonded to a surface of the optically transparent member. Pump light is directed through the transparent plate to optically pump the solid state laser medium. Heat conduction is mainly through the surface of the laser medium where the heat is introduced by the pump light. Heat flows in a direction opposite to that of the pump light because the side of the laser medium that is opposite to that of the pump face is not in thermal contact with a conductor and thus there is no heat flux (and hence, no temperature gradient), thus producing a thermal gradient-reduced zone. A laser cavity is formed around the laser medium such that laser light oscillating within the laser cavity reflects by total-internal-reflection from the interface between the pump face and the optically transparent plate and enters and exits through a thermal gradient-reduced zone.

13 Claims, 2 Drawing Sheets

THERMAL LENS ELIMINATION BY GRADIENT-REDUCED ZONE COUPLING OF OPTICAL BEAMS

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of the Invention

The present invention relates to lasers, and more specifically, to the elimination of thermal lensing in such lasers.

2. Description of Related Art

Thermal lensing is distortion of an optical component as a result of heat, which can influence the divergence and the mode quality of a beam passing through the component. It is a problem that affects optical systems, especially high-average-power lasers, and most particularly side-pumped lasers. Zig-zag slab laser architectures have been used in some situations, in which pump light enters the slab through two opposing faces and heat is conducted out via the same or another pair of opposing faces. The laser slab's ends allow for beam entry and exit. These architectures, by virtue of the mirror symmetry of their temperature distribution and zig-zag beam propagation, give some compensation of thermal lensing. The lateral inversions that take place at the total internal reflections (TIRs) act to make the optical path length (OPL) uniform across the beam aperture because each side of the beam alternately samples a hot, high-gain and a cold, low-gain region.

In some lasers, mirror symmetry of the gain/beam propagation region is hard to achieve because the pump light is strongly absorbed, resulting in a very thin gain region. It may not be practical to fabricate a slab thin enough for two-side pumping, and cooling through the narrow, un-pumped faces may be difficult. Normally, single-sided pumping would be employed, and the un-pumped side of the slab used for heat conduction to a heat sink. In this case, the heat due to absorbed pump light enters one face and is conducted out through the opposite face, setting up a thermal gradient. One can show analytically that a beam propagating with a TIR bounce in such a medium can be arranged not to "steer" as the pump power is changed (i.e. temperature rise is varied) by having the beam bounce symmetrically off the midpoint of the pumped region. The dashed line represents the path with no pumping, and the solid line shows the refraction present with the pump turned on. The "sideways" variation of the optical path length, $$\frac{\partial OPL}{\partial z_0},$$

is a measure of the "wedge," or beam steering, and vanishes at the point of symmetry, even though, $$\frac{\partial^2 OPL}{\partial z_0^2},$$

which relates to the thermal lensing, does not.

SUMMARY OF THE INVENTION

It is an object of the present invention to provide a thermal gradient-reduced zone solid state laser.

If a resonated laser beam could be introduced and extracted in such a way that OPL did not depend on $Z_0$, then the lensing as well as steering could be eliminated. The invention produces a "gradient-reduced zone" adjoining the region where the 1-dimensional temperature/stress/refractive-index variation exists. A change in $Z_0$ is equivalent to a sideways displacement of the Z axis along the x axis, which (by our definition) has no effect on the refractive-index profile in the picture. A novel thermal management scheme is required to create this situation.

A thermal gradient-reduced-zone laser includes a laser medium and an optically transparent plate with an index of refraction that is less than the index of refraction of the laser medium. The optically transparent member may include a ridge bonded to said the pump face of the laser medium. Sapphire is one type of material usable as the optically transparent plate. The pump face of the laser medium is bonded to a surface of the optically transparent member. Pump light is directed through the transparent plate to optically pump the solid state laser medium. A micro-lens conditioned laser diode array may be used as the pump source; however, any pump source may be used provided that it is strongly absorbed within the laser medium. Heat conduction is mainly through the surface of the laser medium where the heat is introduced by the pump light. Heat flows in a direction opposite to that of the pump light because the side of the laser medium that is opposite to that of the pump face is not in thermal contact with a conductor and thus there is no heat flux (and hence, no temperature gradient), thus producing a thermal gradient-reduced zone. A laser cavity is formed around the laser medium such that laser light oscillating within the laser cavity reflects by total-internal-reflection from the interface between the pump face and the optically transparent plate and enters and exits through a thermal gradient-reduced zone. The laser medium may comprises a solid state material such as Er:YAG, Cr:ZnSe or EAG, but is not limited to solid state laser materials, e.g., a laser dye may be used.

DETAILED DESCRIPTION OF THE INVENTION

The $Er^{3+}$ laser has recently been investigated rather intensively with the goal of improving its efficiency and understanding the complex level kinetics that allow quasi-CW operation in a variety of oxide and fluoride hosts. Near-Watt-level operation has been demonstrated, mainly with end-pumped and monolithic designs that inherently afford excellent spatial overlap between the tightly-focused pump and resonated beams. Unfortunately, limited diode pump brightness hampers scaling to higher power levels in such schemes.

It has been observed that a side-pumped laser compatible with high-brightness laser diode array packages effectively sidesteps this diode brightness limitation; however, characterization of this laser showed that thermal focusing in the laser slab limited the obtainable average power and beam quality. Also, a substantial increase in laser efficiency could be achieved by lowering the temperature of the Er:YAG crystal.

Figure 1:
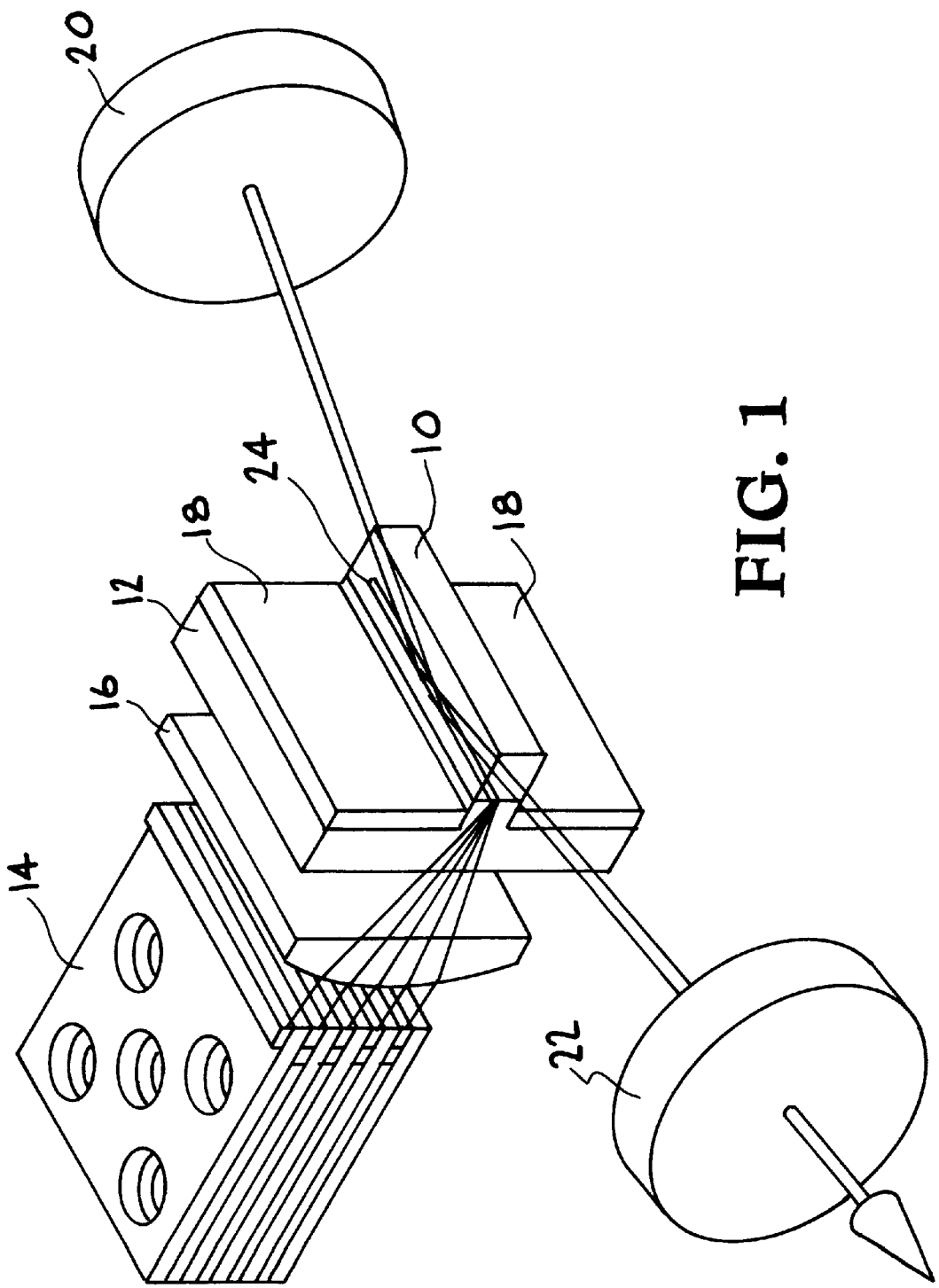
FIG. 1 Shows a composite-design diode-pumped Er:YAG laser with "TIR-bounce" beam propagation.

Evidently much can be gained with improved cooling techniques that (a) reduce the temperature in the gain region and (b) reduce thermal lensing. The present invention is a "composite" design (FIG. 1) where one embodiment includes Er:YAG slab that is diffusion-bonded to a sapphire plate that removes heat directly at the pump face, reducing the gain-region temperature and reducing thermal lensing. The invention is not limited to the use of solid state laser materials, e.g., a suitable laser dye within a cuvette may be used as the laser medium. Er:YAG crystal 10 is bonded to an optically transparent material such as a sapphire plate 12 through which the pump light (from a micro-lens conditioned diode array 14) is transmitted, providing these improvements. The invention includes a 1 cm focal length cylindrical lens 16 between the array 14 and sapphire plate 12. Heat removal takes place at the crystal pump face, shortening the conduction path (compared with the ~2 mm dimension in the original design) and reducing the effective thermal impedance. The region of greatest heating directly adjoins the sapphire heat sink. This, the coldest spot in the crystal, is also the region of peak amplification. Removing the heat from the pump face (and from no other region) largely eliminates heat conduction from the front to the back of the crystal, creating a zone with reduce temperature gradients. This gradient-reduced zone (see below) largely equalizes the optical path length $OPL \equiv \int n \, ds$ across the aperture of the resonated beam, substantially reducing thermal lensing. Any optically transparent member may be substituted for sapphire plate 12 if the material has an index of refraction that is less than the index of refraction of the laser medium. A laser cavity is formed around the laser medium and may consist of a high reflector 20 and an output coupler 22. The system can be configured as an optical amplifier by substituting an appropriate optic, e.g., a dichroic beamsplitter, for high reflector 20. Laser light oscillating within the laser cavity reflects by total-internal-reflection from the interface 24 between the crystal 10 pump face and the optically transparent plate 12 and enters and exits through the thermal gradient-reduced zone.

The pump array in this embodiment uses 5 bars and produces a spot 350 μm high and 10 mm long, and the overall pump delivery efficiency is only ~63% because of clipping and non-AR-coated optics. Peak pump power delivered to the crystal is estimated to be 156 Watt. Heat is removed from the 2 mm-thick sapphire plate 12 with water-cooled copper heat sinks 18 containing apertures for pump light delivery.

While one embodiment uses $Er_{1.5}Y_{1.5}Al_5O_{12}$ ("Er:YAG"), another uses $Er_3Al_5O_{12}$ ("EAG"). Effective pump absorption coefficients were ~20 cm$^{-1}$ in each case. Brewster-cut faces resulted in sample dimensions of 2 mm×2 mm×10 mm×11.4 mm. The polished laser slabs were "diffusion-bonded" to 10×10×2 mm sapphire plates in a manner preserving a high-optical-quality interface. Four primary considerations led to selection of sapphire for the plate material: (1) high thermal conductivity (28 W/m·K, to be compared with 5 W/m·K for Er:YAG,) (2) high transparency at the 2.94 μm laser and 965 nm diode pump wavelengths, (3) refractive index difference sufficient for TIR at reasonable angles of incidence ($\Delta n=0.06$ at 3 μm for a 16 degree maximum grazing angle,) and (4) ability to bond to Er:YAG. Diffusion bonding of Er:YAG to sapphire, gave bonds best along the midlines of the laser crystals.

Calculated temperature profiles indicate a ~50° C. smaller temperature rise in the pump face/TIR bounce region for the composite design than in the original design. Whereas the original design shows a steadily-declining temperature due to heat conduction from the front to the back of the crystal, the composite design has a nearly gradient-free region at the back of the crystal.

Figure 2:
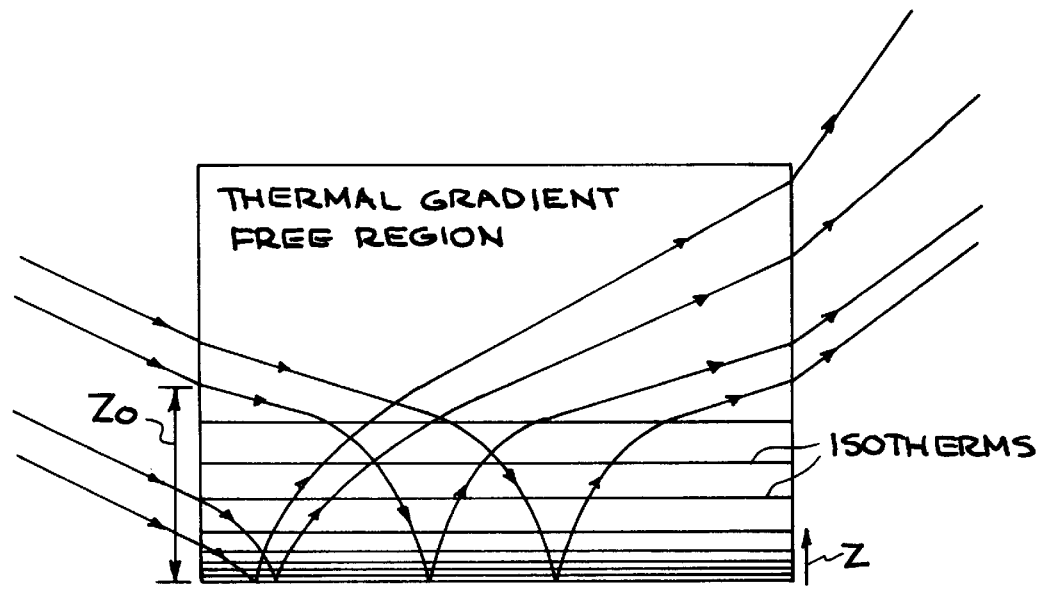
FIG. 2 shows a conceptual view of isotherms in a slice through the laser slab's midplane, showing that heat removal at the pump face creates a gradient-reduced region deep in the crystal.

The utility of the gradient-reduced zone is illustrated in FIG. 2, a conceptual view of the isotherms in a slice through the mid-plane of the laser crystal (assuming uniform heat deposition per unit length and a pump penetration depth short compared with the crystal depth.) The horizontal tilt and focus imposed on a beam entering the crystal at a depth $z_0$ are respectively proportional to $\partial OPL/\partial z_0$ and $\partial^2 OPL/\partial z_0^2$, where $OPL \equiv \int n \, ds$. With beam entry and exit via the gradient-reduced region, these derivatives (and higher-order z-axis derivatives) are identically zero, eliminating pump-light-induced horizontal beam steering and focusing.

Figure 3:
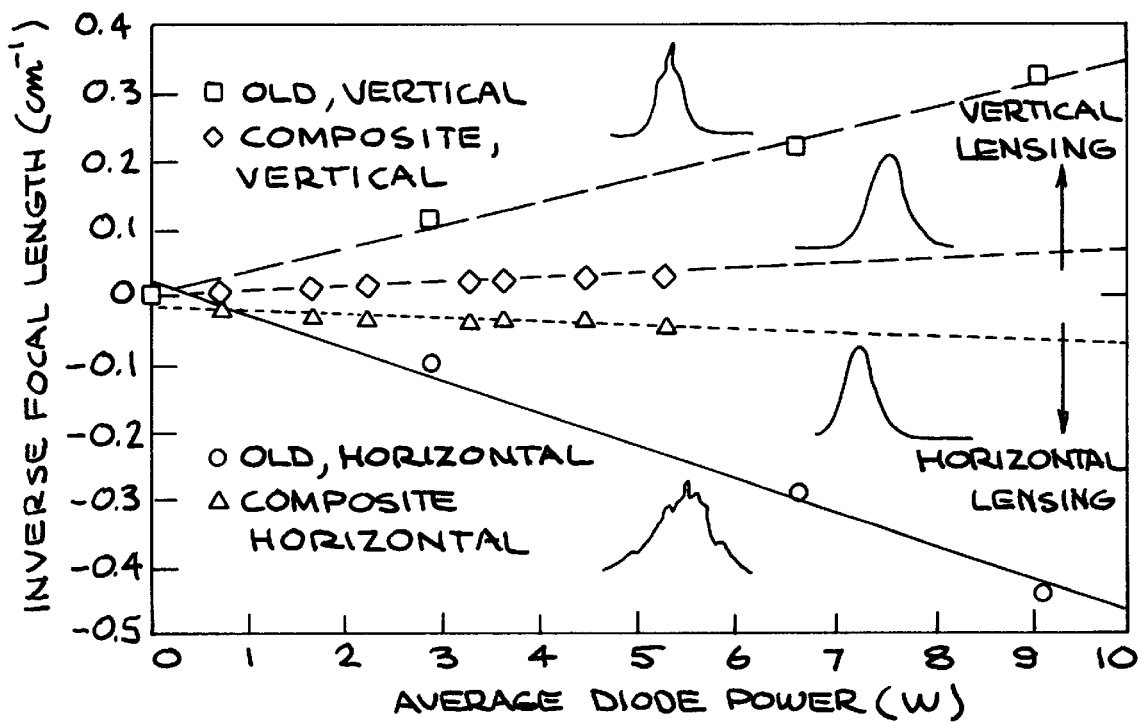
FIG. 3 shows thermal lensing measurements at varying levels of diode pump power, showing greatly-reduced thermal lensing in the composite Er:YAG/sapphire sample.

FIG. 3 shows results of thermal lensing measurements performed on the original and composite laser samples, obtained with extra-cavity 633 nm probing (along the path taken by the 2.94 μm beam during laser operation) of the laser crystals experiencing varying diode-array pump powers. Next to the curves are line-outs of the original and composite laser intensity profiles at 300 mW output power, with no mode-control apertures. The composite laser exhibits a nearly—gaussian mode, but the original laser's mode is aberrated. As expected, the inverse focal length scales linearly with pump power. Whereas the focal power $(1/f)/P_{pump}$ in the horizontal plane of the original design was $-4.9 \times 10^{-2}$ cm$^{-1}$/W, the composite design had a focal power of $-0.68 \times 10^{-2}$ cm$^{-1}$/W, indicating a factor of 7.2 reduction in thermal lensing. The vertical focal power dropped from $3.5 \times 10^{-2}$ cm$^{-1}$/W in the original design to $0.81 \times 10^{-2}$ cm$^{-1}$/W in the composite design, a factor of 4.2 improvement. These results validate the "gradient—reduced zone" concept underlying the new laser architecture.

Tests of the EAG composite-sample laser were performed with a cavity length of 27 mm and no intracavity mode-control aperture. Beam-quality ($M^2$) measurements at 300 mW average laser output with a pyroelectric-array camera gave $M_h^2 \approx 1.17$ in the horizontal direction and in the vertical dimension, $M_v^2 \approx 1.44$ was derived. Clearly, even with a short cavity, operation at $(M_h^2 \cdot M_v^2)^{1/2}18$ 1.3 times diffraction limited is possible for this design. Compared with the original design delivering $P_{out}$=710 mW at $M_h^2 \approx 3.4$, $M_v^2 \approx 1.4$, with a 40 mm cavity length, the "effective far—field brightness," proportional to $P_{out}/(M_h^2 \cdot M_v^2)$, is comparable. FIG. 3 also shows line-outs of emitted beams of both the composite-sample and original laser (at 48 mm cavity length) operating at ~300 mW output power. While the profiles from the composite laser look nearly gaussian, the original laser design shows spikes, particularly in the horizontal plane (where the lensing is worse.) Although multimode operation cannot be directly blamed on an intracavity lens, it is likely that the original design exhibited higher-order thermal aberrations as well, which would affect beam quality more directly.

Slope-efficiency measurements using the Er:YAG crystal with a pulsewidth and repetition rate of 500μ sec and 120 Hz resulted in a threshold pump power of 1.3 Watt and a maximum average output power of 1.16 Watt. The maximum optical efficiency was 14%, roughly a factor of 2 better than that obtained with the original design. The 18% slope along the nearly-straight mid-portion of the slope-efficiency curve was also an improvement. Further laser performance increases should be obtainable by optimizing the Er concentration, improving the transmission of the pump light, and testing other crystalline host materials with higher luminescence quantum yields.

The new side-pumped, diffusion-bonded laser architecture allows efficient heat removal without flowing cooling water or gas across a crystal face. Its thermal gradient-reduced region for resonated beam entry and exit provides a degree of thermal-lens compensation reminiscent of a highly-symmetric zig-zag slab system. This advanced sample geometry may be useful in other types of solid-state lasers where the gain is sensitive to operating temperature, or where thermal lensing is especially troublesome.

Changes and modifications in the specifically described embodiments can be carried out without departing from the scope of the invention, which is intended to be limited by the scope of the appended claims.

The invention claimed is:

1. A thermal gradient-reduced-zone laser, comprising:
   a laser medium comprising a pump face;
   an optically transparent member having an index of refraction that is less than the index of refraction of said laser medium, wherein said optically transparent member includes a first surface and a second surface, wherein said pump face is bonded to said first surface;
   a pump laser for producing pump light to optically pump said laser medium, wherein heat conduction is mainly through said first surface where the heat is introduced by said pump light, wherein heat flows in a direction opposite to that of said pump light, wherein the side of said laser medium opposite to that of said pump face is not in thermal contact with a conductor and thus there is no heat flux (and hence, no temperature gradient), thus producing a thermal gradient-reduced zone; and
   a laser cavity formed around said laser medium, wherein laser light oscillating within said laser cavity reflects by total-internal-reflection from the interface between said pump face and said optically transparent member and enters and exits through said thermal gradient-reduced zone.

2. The thermal gradient-reduced zone laser of claim 1, wherein said laser medium comprises a solid state material.

3. The thermal gradient-reduced zone laser of claim 1, wherein said optically transparent member includes a first surface comprising a ridge, said optically transparent member further including a second surface, wherein said pump face is bonded to said ridge.

4. The thermal gradient-reduced zone laser of claim 3, wherein said pump face is diffusion-bonded to said ridge.

5. The thermal gradient-reduced zone laser of claim 1, wherein said optically transparent member comprises a sapphire plate.

6. The thermal gradient-reduced zone laser of claim 1, further comprising a copper heatsink operatively connected to said first surface of said optically transparent member.

7. The thermal gradient-reduced zone laser of claim 1, wherein said pump laser comprises a micro-lens conditioned laser diode array.

8. The thermal gradient-reduced zone laser of claim 7, further comprising a cylindrical lens operatively located between said micro-lens conditioned laser diode array and said second surface of said optically transparent member to direct said pump light onto said solid state laser medium.

9. The thermal gradient-reduced zone laser of claim 2, wherein said solid state material comprises Cr:ZnSe.

10. The thermal gradient-reduced zone laser of claim 2, wherein said solid state material comprises Er:YAG.

11. The thermal gradient-reduced zone laser of claim 2, wherein said solid state material comprises EAG.

12. The thermal gradient-reduced zone laser of claim 1, wherein said pump source provides a wavelength of pump light that is strongly absorbed by said laser medium.

13. The thermal gradient-reduced zone laser of claim 1, wherein said laser medium comprises dye.

* * * * *